United States Patent [19]

Spease et al.

[11] Patent Number: 4,688,445
[45] Date of Patent: Aug. 25, 1987

[54] REMOTE CONTROL BALANCED ADJUST SYSTEM

[75] Inventors: Arthur L. Spease, Livonia; Jody Tenjeras, Oak Park, both of Mich.

[73] Assignee: Teleflex Incorporated, Limerick, Pa.

[21] Appl. No.: 854,010

[22] Filed: Apr. 21, 1986

[51] Int. Cl.⁴ .............................................. F16C 1/10
[52] U.S. Cl. ..................................... 74/501 R; 74/502
[58] Field of Search ............ 74/501 R, 501 A, 501 D, 74/501 E, 501 F, 502, 503; 188/196 B

[56] References Cited

U.S. PATENT DOCUMENTS

| | | | |
|---|---|---|---|
| 2,101,160 | 12/1937 | Weber | 74/502 |
| 2,172,294 | 9/1939 | Riddell | 74/500.5 |
| 3,393,578 | 7/1968 | Tschanz | 74/500.5 |
| 3,587,341 | 6/1971 | Fiddler | 74/500.5 |
| 4,331,041 | 5/1982 | Bennett | 74/500.5 |
| 4,418,583 | 12/1983 | Taig | 74/500.5 |

*Primary Examiner*—Gary L. Smith
*Assistant Examiner*—Vinh Luong

*Attorney, Agent, or Firm*—Reising, Ethington, Barnard, Perry & Milton

[57] ABSTRACT

A motion transmitting remote control assembly including a core element movably supported in a conduit. A support member (18) adapted to be connected to a support structure and is attached to the conduit (12) and a slider member (28) slideably disposed in a passageway (24) extending longitudinally through the support member (18). The slider member (28) includes a plurality of locking teeth (62) spaced longitudinally along the slider member (28). The support member (18) also includes a closed cavity (38) extending from one side of the conduit (12) which supports an integral locking member (34) and a spring (36). The locking member (34) is adjacent the slider member (28) and includes a plurality of locking teeth (64) extending for a width coextensive to that of the cavity (38) and spring (36). The spring (36) is between the support member (18) and the locking member (34) to urge the locking member (34) into engagement with the slider member (28) for normally preventing longitudinal movement of the conduit (12).

14 Claims, 3 Drawing Figures

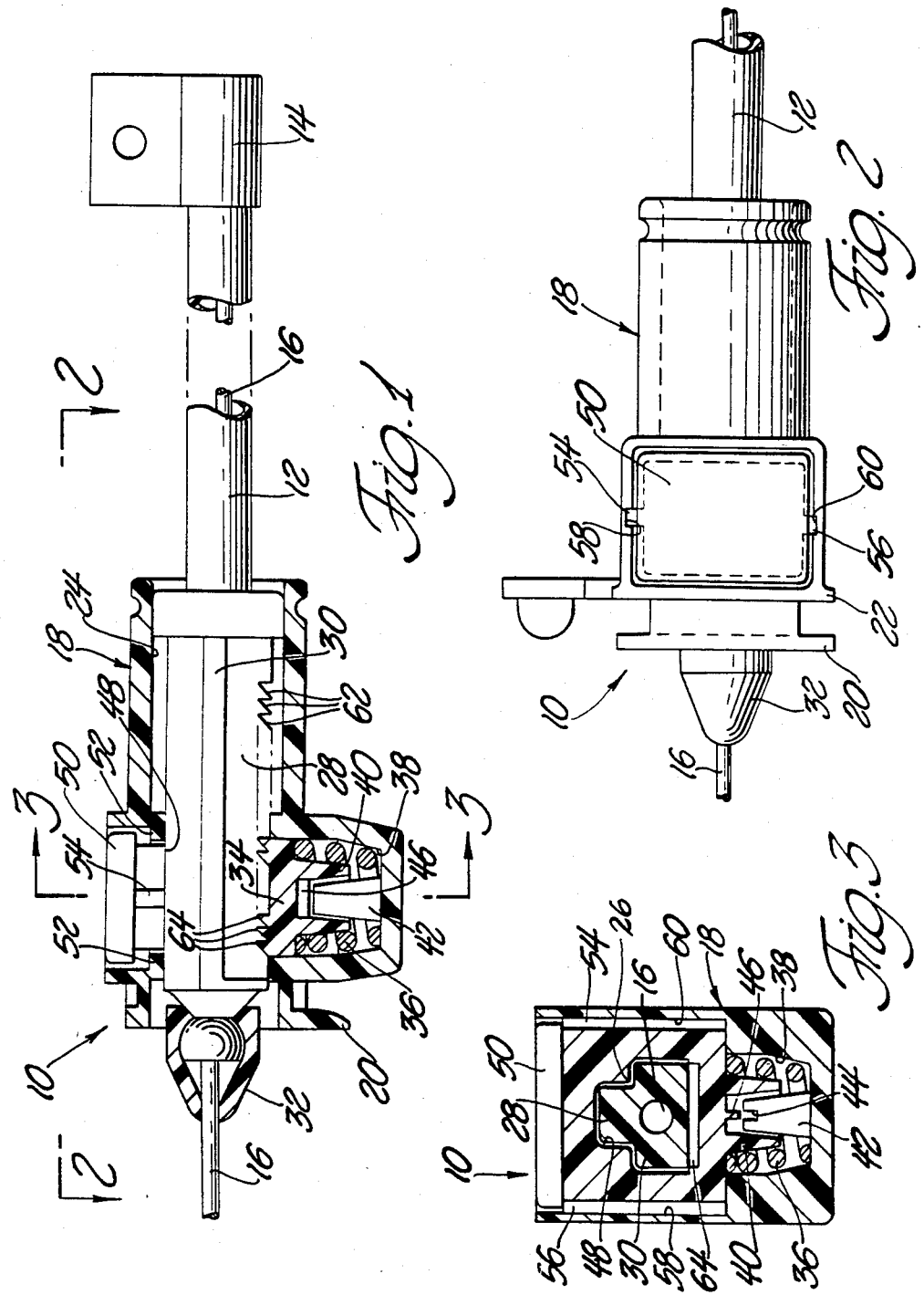

REMOTE CONTROL BALANCED ADJUST SYSTEM

FIELD OF THE INVENTION

The subject invention relates to a motion transmitting remote control assembly of the type wherein motion is transmitted in a curved path by a flexible motion-transmitting core element movably supported by a flexible conduit.

BACKGROUND OF INVENTION

Such remote control assemblies normally include means adjacent each end of the conduit for attaching the conduit to a support structure with the core element extending from each end of the conduit. It is frequently desirable to adjust the length of the conduit to change the position at one end of the core element extending from the conduit once the assembly is installed. An example of such a situation is where a remote control assembly is utilized to interconnect the accelerator pedal and a throttle valve in automobiles. In this situation, the assembly is usually installed by attaching the conduit to the body of the automobile adjacent the accelerator pedal while attaching end of the core element extending therefrom to the accelerator pedal. The opposite end of the conduit is attached to a support structure adjacent the carburetor so that the other or opposite end of the core element may be attached to the operating lever of the throttle valve. Frequently, however, the end of the core element adjacent the carburetor does not extend from the conduit a proper amount for attachment to the operating lever of the throttle valve. During such installation, the accelerator pedal is in its unmoved or idle position as is the operating lever of the throttle valve and if the end of the core element adjacent the operating lever of the throttle valve is not positioned correctly, the operating lever of the throttle valve must be moved for attachment of the core element so that the end result is that the accelerator pedal is in the idle position but the operating lever of the throttle valve is not. The position of the end if the core element extending from the conduit, i.e., the distance the core element extends from the conduit, may be changed by altering the length of the path over which the conduit extends.

DESCRIPTION OF THE PRIOR ART

There are assemblies known in the prior art where an adjustment in the length of the conduit may be accomplished in order to change the distance the core element extends from the end of the conduit during an installation procedure. One such assembly includes a support member adapted for attachment to a support structure with a slider member movably supported by the support member for longitudinal movement and integrally connected to the end of the conduit whereby the conduit effectively changes in length as the slider member moves relative to the support member. The support member movably supports a locking member which engages the slider member to control the longitudinal movement of the adjustment of the slider member relative to the support member. The locking member engages with coacting means on the slider member. A biasing means reacts between the support member and locking member for urging the locking member into engagement with the sliding member. In order to provide for automatic adjustment of the length of the conduit, the slider member may ratchet relative to the latch member whereby once the assembly is installed, as in the environment described above, the accelerator pedal may be pushed to the full throttle position placing the core element in tension to place a longitudinal force on the conduit whereby the slider member ratchets relative to the support member to the proper adjusted position. The broad concept of accomplishing the automatic adjustment of the length of a conduit upon movement of the core element is illustrated in U.S. Pat. No. 3,662,617, grated May 16, 1972, in the name of William G. Bennett et. al. which is assigned to the assignee of the subject invention. Two more specific examples of the concept are illustrated in U.S. Pat. No. 3,710,645, granted Jan. 16, 1973, in the name of William G. Bennett and copending application Ser. No. 775,681 filed Sept. 13, 1985 in the name of Arthur L. Spease, both of which are assigned to the assignee of the subject invention. The latter discloses such a system including a support member which incorporates a dual latch member engageable with the conduit for controlling the longitudinal movement of the conduit relative to the support member. The latch members engage in the ratcheting teeth of the slider member via a tooth in an aperture in each of the latch members. The latch member is biased into engagement with slider member by a spring which holds the latch member in engagement with the slider member to prevent a change in length on the conduit when a conduit has been adjusted to the proper length. A cap member connects the biasing means and the latch members and pivots as the latch members are moved into and out of engagement with the slider member. An inadequacy in this assembly is that the cap member is a separate part of the locking means thereby making assembly difficult in some situations.

The U.S. Pat. No. 3,710,645 discloses a system wherein the locking means comprises a plurality of locking teeth which engage the ratcheting teeth of the slider member. The locking means is biased into engagement with the slider member by a straight metal wire spring which holds the locking member in engagement with the slider member to prevent a change in length of the conduit when a conduit has been adjusted to the proper length. A portion of the locking means extends outside the support member a direction away from the slider member. An inadequacy in this assembly, the locking means is not in an enclosed cavity therefore allowing for contamination of the interior of the device with debris.

SUMMARY OF THE INVENTION AND ADVANTAGES

The subject invention relates to a motion transmitting remote control assembly of the type for transmitting forces along a curved path by a motion transmitting core element movably supported within a flexible conduit with the ends of the core element extending from the ends of the conduit. The assembly includes a support member for supporting the conduit and a locking means engageable with the conduit for controlling the longitudinal movement thereof relative to the support member. A biasing means reacts between the support member and the locking means for urging the locking means into engagement with the conduit while allowing the locking means to be moved out of engagement with the conduit in response to predetermined force. The locking means is characterized by the support member defining a closed cavity on the first side of the conduit and the locking means being an integral member having a locking portion engaging the first side of the conduit. The biasing means is disposed in the closed cavity to react between the cavity of the support member and the locking means to urge the locking means into engagement with the conduit.

Prior assemblies have proven satisfactory, however, there is a need for a remote control assembly wherein the locking member is an integral member, for ease of assembly, within an enclosed cavity, to eliminate contamination of the interior, having a plurality of teeth for engagement with the slider member for controlling change in the length of the conduit.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross-sectional view of a preferred embodiment of the subject invention;

FIG. 2 is an enlarged top view taken substantially along line 2—2 of FIG. 1; and FIG. 3 is a cross-sectional view taken substantially along line 3—3 of FIG. 2.

DESCRIPTION OF PREFERRED EMBODIMENT

A motion-transmitting remote control assembly constructed in accordance with the subject invention is generally shown at 10. The assembly 10 includes a flexible conduit 12. The conduit 12 is preferably of the well known type including an inner tubular member made of organic polymeric material and surrounded by a plurality of long lay wires disposed helically thereabout with a casing of organic polymeric material disposed about the long lay wires and about the inner tubular member. A fitting 14 is attached to one end of the conduit 12 and is adapted by a flange with a hole therein for attachment to the conduit of a support structure, such as the body of a vehicle.

A flexible motion-transmitting core element 16 is movably supported by the conduit 12 with the ends of the core element 16 extending from the ends of the conduit 12. The motion-transmitting core element 16 is a wire member, as illustrated, but also may comprise metal strands helically wound together in cable-like fashion. A coupling member (not shown), of the well known type, is disposed about the end of the core element 16 for attachment of the core element 16 to an operated or operating member. The opposite end of the core element 16 may include a similar terminal member.

The assembly also includes a support member, generally indicated at 18, and adapted for attachment to a support structure. The support member 18 is adapted for attachment to a support structure by snap-in means 20. The snap-in means 20 are inserted through an opening in a support member such as a bracket to retain the support member 18 attached to the support bracket. Adjacent the snap-in means 20 is a flange 22 which forms a part of the support member 18. The snap-in means 20 may be of the type forming the subject matter of U.S. Pat. No. 3,427,894, granted to August E. Tschanz on Feb. 18, 1969, and assigned to the assignee of the subject invention.

The support member 18 includes a passageway 24 extending therethrough. The conduit 12 includes a slider member or sleeve 28 movably supported in the passageway 24. The slider member 28 is preferably of a rigid organic polymeric material molded about the plastic exterior of the conduit 12. The slider member 28 includes shoulders 30 on either side of the slider member 28 extending parallel to the longitudinal axis of the slider member 28. The shoulders 30 increase the rotational stability of the remote control assembly. The support member 18 presents shoulders 26 projecting from the support member 16 into the passageway 24 and extend parallel to the longitudinal axis of the passageway 24. The shoulders 30 on the slider member 28 abut the shoulders 26 extending from the support member 18 to provide a further support and stability to the assembly.

A swiveling dust cover and/or core wiper 32 is supported through a swivel socket on the end of the slider member 28.

The assembly includes a coacting locking means 34 for controlling the longitudinal movement of the conduit 12 relative to the support member 18. A biasing means 36, comprising a coil spring 36, reacts between the support member 16 and the locking means 34 for urging the locking means 34 into engagement with the slider member 28 of the conduit 12. The biasing means 36 allows for the locking means 34 to be moved out of engagement with the slider member 28 in response to a predetermined force.

The locking means 34 is disposed within a cavity 28 in the support member 18 the length of which is coextensive to the width of the biasing means 36. The upper end of the locking means 34 engages the underside of the slider member 28. The locking means 34 has a skirt 40 extending downwardly into the cavity 38 wherein the periphery of the skirt 40 is parallel and adjacent a temperature responsive means 42, in the form of a slug 42, extending upwardly from the support member 18 into the cavity 38. The skirt 40 and the slug 42 guides the locking means 34 into the cavity when moved out of engagement with the slider member 28. The slug 42 has a notch 44 (FIG. 3) in its upper portion. The base of the skirt 40 has a tab 46 extending downwardly opposite the notch 44 of the slug 42 for engagement within the notch 44 to further guide the locking means 34 when the locking means 34 is urged into and out of engagement with the slider member 28. A flange extends outwardly from the base of the skirt 34. The biasing means 36 is disposed about the slug 42 and the skirt 40 to react between the bottom of the cavity 38 against the support member 18 and the flange on the locking means 34.

The locking means 34 has an aperture 48 surrounding the conduit 12 to allow longitudinal movement of the conduit 12 therethrough. An integral button 50 is on the side opposite the locking means 34 with respect to the conduit 12 and aperture 48. A manual adjust feature is accomplished by depression of the button 50 moves the locking means 34 out of engagement with the slider member 28 for longitudinal movement in either direction of the slider member 28. The support member 18 includes annular shoulders 52 which surround the stem of the button 50 adjacent the slider member 28. The distance the button 50 can be depressed is limited by the shoulders 52 coming in contact with a flange extending about the top of the button 50. A pair of tabs 54 and 56 extend outwardly from and on opposite sides of the locking means 34. The support member 18 has two grooves 58 and 60 opposite the tabs 54 and 56, for guiding the button 50 and the locking means 34 when moving in and out of engagement with the conduit 12 wherein the tabs 54 and 56 slide along the grooves 58 and 60.

The coacting ratcheting means comprises a plurality of locking teeth 62 on the bottom of the slider member 28 and a plurality of locking teeth 64 on the bottom of the aperture 48 in the integral locking means 34 to automatically allow the conduit 12 to move longitudinally relative to the support member 18 in response to a predetermined longitudinal force applied to the conduit 12 through the core element 16 whereby the distance the core element 16 extends and the conduit 12 may be adjusted. As explained above, in certain situations where tension is placed upon the core element 16, a force will be applied to the conduit 12 when its in a tortuous path urging the conduit 12 to shorten in length between its support and in such a situation the slider member 28 will ratchet forwardly to an adjusted position. The teeth 62 on the slider member 28 and the teeth 64 on the locking means 34 have a ratcheting configuration for allowing movement of the slider member 28 in one direction to the left, as illustrated in FIG. 2, relative to the support member 18 while engaged by the locking means 34 but prevents such movement in the opposite direction while engaged by the locking means 34 thereby effecting automatic ratcheting adjustment in the effective length of the conduit 12. If movement to the right is required during adjustment, depression of the button 50 allow the locking means 34 to be moved out of engagement with the conduit 12 for movement of the conduit 12 in either direction. The teeth 64 are disposed in side by side relationship from one end of the bottom of the aperture 48 to the other and also extend completely across the aperture 48 between the opposite walls thereof.

The temperature-responsive means 42 is a slug 42 that reacts between the support member 18 and the locking means 34 in parallel with the spring 56 for allowing movement of the locking means 34 in response to a predetermined force in a predetermined temperature range and for requiring higher forces to move the locking means 34 than the predetermined force at temperatures out of the predetermined temperature range. The operation of the slug 42 may be of the type forming the subject matter of U.S. Pat. No. 4,331,041 granted to William G. Bennett on May 25, 1982 and assigned to the assignee of the subject invention. Specifically, the slug 42 would allow normal operation of the locking means 34 in a normal ambient temperature range but would offer greater resistance to the movement of the locking means 34 as temperatures fall below that temperature range. By way of example, the slug 42 may have no effect upon the locking means 68 in its coaction with the spring 36 during assembly at an automotive plant to obtain the desired adjusted length of the conduit. However, shoujld the automobile be subjected to cold temperatures which increases the forces necessary to be transmitted by the core element 16 the slug 42 would become more resistive to require a greater force to move the locking means 34 thereby preventing automatic or inadvertent adjustment in the length of the conduit 12 to an undesired position.

The temperature responsive means 42 is made of a normally resilient organic polymeric material which increases in hardness with a decrease in temperature. As will be appreciated, the spring 36 and the slug 42 will be placed in compression upon disengaging movement of the locking means.

All of the components except the core element 16 and the locking means 34 and the spring 36 are preferably made of organic polymeric or plastic materials.

The invention has been described in illustrative manner and it is to be understood that the terminology which has been used is intended to be in the nature of words of description rather than limitation.

Obviously many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly of the type for transmitting forces along a curved path by a flexible transmitting core element, said assembly comprising: a flexible conduit (12) having opposite ends, a flexible motion transmitting core element (14) movably supported by said conduit (12), a support member (18) for supporting said conduit (12), locking means (34) movable transversely to said conduit (12) into and out of engagement with said conduit (12) for controlling the longitudinal movement thereof relative to said support member (18), biasing means (36) reacting between said support member (18) and said locking means (34) for urging said locking means (42) into engagement with said conduit (12) while allowing said locking means (34) to be moved out of engagement with said conduit (12) in response to a predetermined force, said support member (18) defining a closed cavity (38) having a bottom opposite said locking means (34) on a first side of said conduit (12) and said locking means (34) being an integral member having a locking portion (64) engaging said first side of said conduit (12), said biasing means (36) being disposed in said closed cavity (38) to react between said cavity (38) of said support member (18) and said locking means (34) to urge said locking portion into engagement with said conduit (12), said locking means (34) including a pair of guide tabls (54, 56) located on opposite sides of said locking means (34) for guiding said locking means (34) in said cavity (38), said locking means (34) being rectangular in shape, and including an aperture (48) surrounding said conduit (12) for allowing longitudinal movement of conduit (12) through said locking means (34), and said locking means (34) and said conduit (12) including coacting teeth (62, 64) for controlling longitudinal movement of the conduit (12) relative to the support member (18), said teeth (64) of said locking means (34) are side by side from one end of said aperture (48) to the other and extend completely across said aperture (48).

2. An assembly as set forth in claim 1 wherein said locking portion (34) extends for a length coextensive to the width of said biasing means (36).

3. An assembly as set forth in claim 2 wherein said locking means (34) includes an integral button (50) disposed on the opposite side of said conduit (12) from said biasing means (36) to act against said biasing means (36) when manually depressed to move said locking means (34) out of engagement with said conduit (12) to allow said conduit (12) to move longitudinally in either direction through said aperture (48).

4. An assembly as set forth in claim 3 wherein said cavity (38) defined by said support member (18) includes a temperature responsive means (42) extending upwardly toward said conduit (12) from said bottom of said closed cavity (38) defining a top, said integral locking means (34) including a skirt (40) disposed about said temperature responsive means (42).

5. An assembly as set forth in claim 4 wherein said locking means (34) includes an annular flange extending about said skirt (40), said biasing means (36) comprising a circular (36) spring disposed about said temperature responsive means (42) and said skirt (40) and reacting between said bottom of said cavity (38) and said flange on said locking means (34).

6. An assembly as set forth in claim 5 wherein said locking means (34) includes a tab (46) extending downwardly from said locking means (34) and located within the base of said skirt (40) to guide said locking means (34) into said cavity (38) when moved out of engagement with said conduit (12).

7. An assembly as set forth in claim 6 wherein said temperature responsive means (42) includes a notch (44) extending downwardly from said top of said temperature responsive means (42), opposite said tab (46) to act with said tab (46) to guide said locking means (34) within said cavity (38) when moved out of engagement with said conduit (12).

8. An assembly as set forth in claim 7 wherein said support member (18) contains guide grooves (58, 60) on opposite sides of said cavity (38) and receiving said tabs (54, 56).

9. An assembly as set forth in claim 8 wherein said support member (18) is further characterized by an annular shoulder (52) extending inwardly from said support member (18) adjacent to the stem of said button (50) and said conduit (12) to limit the distance of depression of said button (50).

10. An assembly as set forth in claim 9 wherein said teeth (62,64) are in a ratcheting configuration for automatically allowing said conduit (12) to move longitudinally in one direction relative to said support member (18) in response to a predetermined force applied to said conduit (12) through said core element (16) normally preventing movement in an opposite direction.

11. An assembly as set forth in claim 10 wherein a temperature responsive means (42) reacts between said support member (18) and said locking means (34) in parallel with said biasing means (36) for allowing movement of said locking means (34) in response to said predetermined force and a predetermined temperature range and for requiring higher forces than said predetermined temperature range.

12. An assembly as set forth in claim 11 wherein temperatures out of said predetermined temperature range are lower temperatures than those in predetermined temperature range.

13. An assembly as set forth in claim 12 wherein said biasing means (36) consists of a coil spring (36) and said temperature responsive means (42) is situated within said biasing means (42) and said biasing means (36) and said temperature responsive means (42) is disposed between said support means (18) and said locking means (34)for compression.

14. An assembly as set forth in claim 13 wherein said temperature responsive means (42) is made of a normally resilient organic polymer plastic molded into an elongated slug (42).

* * * * *